March 15, 1966   J. T. ZELLERS, JR   3,240,584
GLASS FURNACE WITH MUFFLE LIP-TILE
Original Filed March 19, 1959   3 Sheets-Sheet 1

INVENTOR.
James T. Zellers, Jr.
BY Nobbe & Swope
ATTORNEYS

March 15, 1966 J. T. ZELLERS, JR 3,240,584
GLASS FURNACE WITH MUFFLE LIP-TILE
Original Filed March 19, 1959 3 Sheets-Sheet 2

INVENTOR.
James T. Zellers, Jr.
BY
Nobbe & Swope
ATTORNEYS

March 15, 1966  J. T. ZELLERS, JR  3,240,584
GLASS FURNACE WITH MUFFLE LIP-TILE
Original Filed March 19, 1959  3 Sheets-Sheet 3

INVENTOR.
James T. Zellers, Jr.
BY
Hobbs & Swope
ATTORNEYS

United States Patent Office 3,240,584
Patented Mar. 15, 1966

3,240,584
GLASS FURNACE WITH MUFFLE LIP-TILE
James T. Zellers, Jr., Charleston, W. Va., assignor to Libbey-Owens-Ford Glass Company, Toledo, Ohio, a corporation of Ohio
Continuation of application Ser. No. 800,560, Mar. 19, 1959. This application June 13, 1961, Ser. No. 120,124
11 Claims. (Cl. 65—337)

This application is a continuation of application Serial No. 800,560, filed March 19, 1959, now abandoned.

The present invention relates broadly to the production of sheet or window glass, and more particularly to an improved heat control member for modulating the temperature of molten glass as it advances to the area of drawing into sheet formation.

The principal object of this invention is to provide an improved cover for molten glass in the working receptacle of a sheet glass drawing furnace, with means maintaining the said glass at an optimum of working temperature.

Another object of the invention is to provide an improved cover or so-called lip-tile of hollow construction whereby the influence of a temperature controlling medium can be directed onto the molten glass in the working receptacle of a glass furnace without attendant entry of said medium as a waste gas.

Another object of the invention is to provide an improved lip-tile of the above character adapted to supply a heating or cooling influence onto the surface of molten glass in a working receptacle without the introduction of such influencing medium into the glass furnace which tends to set up undesired turbulency of air in the area of sheet formation.

Another object of the invention is to provide a lip-tile of the above character which is of a hollow construction and has one surface directed toward the molten glass, which surface possesses high radiating characteristics.

Other objects and advantages of the invention will become more apparent during the course of the following description when read in connection with the accompanying drawings.

In the drawings, wherein like numerals are employed to designate like parts throughout the same:

Figure 1:
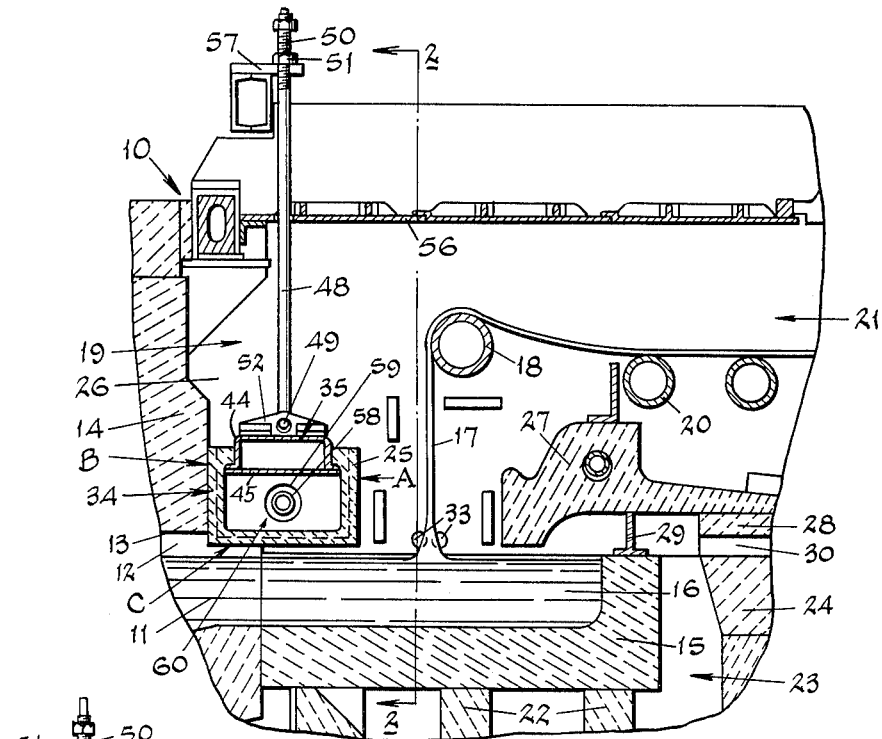
FIG. 1 is a fragmentary longitudinal vertical section through the drawing chamber of a sheet glass drawing furnace.

The term "sheet" or "window" glass has long been accepted in the art as the descriptive designation of flat, continuously-drawn glass having fire-polished surfaces attained during its sheet or ribbon formation; this being one common distinction from so-called "plate" glass which is likewise formed as a continuous ribbon but which is mechanically ground and polished. Since the production of "sheet" or "window" glass depends on working conditions within the furnace to obtain initially smooth and optically transparent glass in sheet form, many lengthy trials and experiments have been carried out in one way or another to improve these conditions and especially by striving to reduce, if not eliminate, the turbulency of air currents within the drawing chamber of the furnace and additionally to control the purity of the air while maintaining the optimum high working temperatures for the glass.

In one way or another, many endeavors have been directed to the control of heat and air conditions in the lower area of the drawing chamber directly before and during the actual sheet drawing operation. In essence, some of these have suggested the use of heating flames to modify the temperatures of the body of molten glass from which the sheet is drawn and likewise to set up a suitable heat barrier against the upper air in the chamber from entering the sheet forming zone and thus producing distortions in the sheet. However efficient such measures have been, the heating sources are known to create areas of turbulent air currents, dirt and waste-gas fuming. According to the present invention, means is provided for obtaining the advantages of extraneous heat at high temperature without the heretofore attendant introduction of undesired dirt or gases. Briefly this is obtained by directing radiant heat onto the surface of the molten glass while reducing the tendency for loss of heat rising therefrom. As equally important is the introduction of a further modifying influence on the surface of the molten glass and especially that in the central area of the working receptacle. Thus, while the application of heat along and onto the surface of the molten glass at the sides of the working receptacle has proven to be beneficial, it has also been found that the central area of the body of glass can be as effectively cooled by the radiant application of colder air thereon to obtain a sheet of desired thickness. That is to say, where heat is in some instances applied to the glass along the sides of the working receptacle, in other instances, the application of cooler air onto the molten glass in the central area may obtain the same result.

With reference now to the drawings and particularly to FIG. 1 thereof, the numeral 10 designates the outlet end of a continuous tank furnace of any conventional or preferred construction and in which a mass of molten glass is produced, refined and cooled to proper working temperature. The molten glass, indicated at 11, flows from the cooling chamber 12 beneath the outlet arch 13 of the end furnace wall 14 into a working receptacle or drawpot 15 to form a relatively shallow pool of molten glass 16 from which it is drawn continuously in sheet or ribbon form.

Although in no way restricted thereto, the present invention is particularly well adapted for use with the so-called Colburn type of sheet glass drawing machine and it will be herein described in that connection. In drawing machines of this well-known character, the sheet 17 is continuously drawn upwardly from the surface of the pool of molten glass 16 and, while still in a semi-plastic condition, although substantially set in its final sheet form is deflected into the horizontal plane about a bending roll 18, situated in the forming or drawing chamber, generally designated by the numeral 19, and then passes over a so-called idler or intermediate roll 20 through a flattening chamber 21 and thence into and through an annealing lehr (not shown).

While contained in the draw-pot 15, the molten glass is held at a relatively high or working temperature by means of heating sources disposed in the area of and usually beneath the said draw-pot. For this purpose, in a conventional Colburn type sheet or window glass machine, the working receptacle or draw-pot is supported upon stools 22 within a pot chamber 23 which is heated by gas flames from burners introduced through the walls 24.

In order to obtain a quiescent atmosphere of relatively stable, high temperature above the molten glass in the draw-pot 15, it has been customary to provide cover members above the draw-pot and to space the same apart to create an area through which the sheet is drawn upwardly from the molten glass body. As well, these cover members are adapted to more or less shield the atmosphere of the drawing chamber through which the drawn sheet moves into the annealing lehr, from the relatively higher temperatures above the draw-pot and in the cooling chamber communicating therewith. Conventionally referred to as "lip-tiles," these covering members are so arranged that one or the "front" member and the other, or the "rear" member, define the space through which the sheet is drawn upwardly. Thus, the front lip-tile 25 is located above the draw-pot 15, at its end communicating with the tank-furnace, and more especially between the side walls 26 of the draw chamber 19, and along one of its longer sides in closely fitting relation with the end wall 14.

On the other hand, the rear lip-tile 27, while being suitably supported by means exterior to the forming or drawing chamber 19, is carried at one of its ends by the bottom or floor structure 28 of the flattening chamber 21. Presently known practice indicates that the provision of a radiant partition 29, the waste gases from the pot chamber burners can be exhausted through passageways, indicated at 30, that are provided in the bottom 28 of the flattening chamber 21. Such a partition, while serving to conduct and radiate the desired amounts of heat across the surface of the molten glass in the draw-pot, is also adapted to seal off the entry of the waste gases in substantially the same, or in a cooperating manner to and with the cover or cap blocks 31 (FIG. 2) interfitting with and along the upper surfaces of the side walls 32 of the draw-pot. Thus, it will be seen that the pool of molten glass 16 is substantially protected from undesired turbulency of air and the dirt of waste gases in the vicinity of and otherwise rising over the draw-pot walls. Likewise, as the sheet 17 is drawn upwardly from the pool of molten glass 16 the width thereof is controlled by conventionally operating knurls 33, until the sheet is deflected around the bending roll 18.

One source of concern in the production of window or sheet glass, according to the manner hereinabove described, has been the presence of unwarranted air currents and contaminating dirt in the vicinity of and above the surface of the molten glass as it flows beneath the outlet arch 13 and the front lip-tile. Both of these unsatisfactory conditions, or one combining with the other, appear to stem from the past use of burners arranged along and beneath the opposite ends of the lip-tile. Many obvious reasons can be advanced for the utility of the burners since the edges of the molten glass flowing along the sides of the draw-pot do so with a certain amount of friction. Likewise, unless provision is made to suitably insulate the furnace walls at these areas, there is a strong likelihood of heat absorption due to cooler outside atmospheres with the consequential cooling and thickening of the molten glass. And unless the working temperature of the glass is held compatible to the speed at which the sheet is formed, there is a tendency for the sides of the sheet to "run" slightly thicker than the central areas thereof.

Now the utility of burners has long been recognized; however, the ensuing flames either reflect from the lip-tile surface downwardly onto the surface of the glass or have been directed substantially downwardly thereupon. Despite the heating effects that may have been thereby realized, the amount of dust and dirt falling into the molten glass, aside from the convection and/or turbulence of the waste gases and air, has reduced the advantages sought to be attained.

Figure 2:
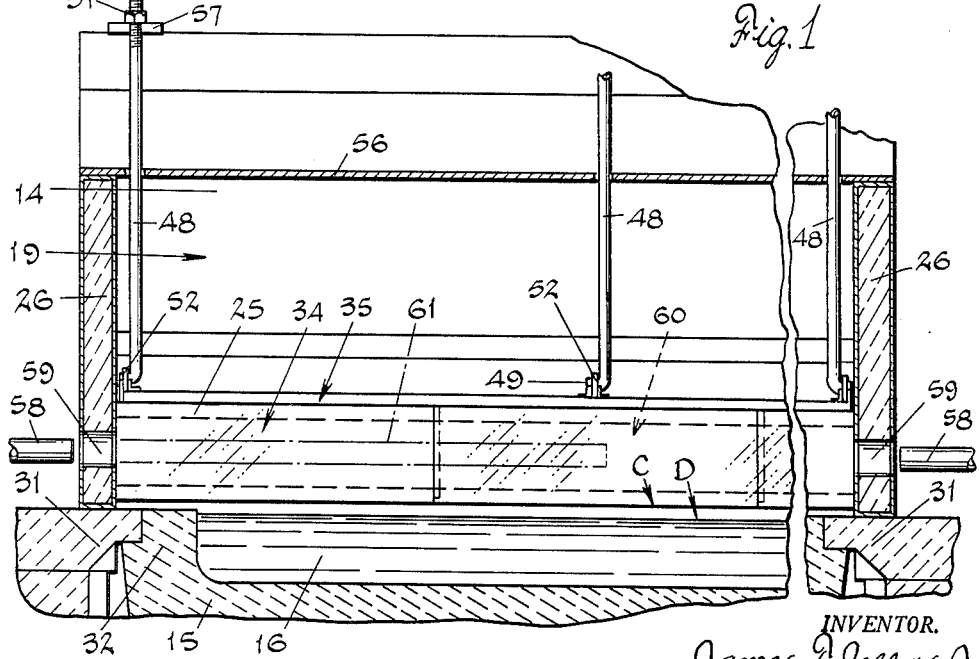
FIG. 2 is a transverse, vertical section of the drawing chamber as taken on line 2—2 of FIG. 1 and illustrating a hollow lip-tile constructed in accordance with one embodiment of the present invention.

In order to overcome these deficiencies which have heretofore been considered inherent to the manner of drawing glass, it is herein contemplated that the front lip-tile will be of a tubular or muffle constructor and which is formed of a refractory material adapted to provide a low reflective and highly heat conductive lower surface. One embodiment of a muffle lip-tile of these characteristics, such as is illustrated at 25, in FIGS. 1 and 2, is accordingly adapted to supply heat within any desired range of temperature to the air space above th draw-pot 15 and to do so without entry of undesired waste gases into the air. As well, the low reflectivity of the bottom surface of the lip-tile greatly reduces the rate of normally expected heat loss from the molten glass by convection through the ambient air.

Figure 4:
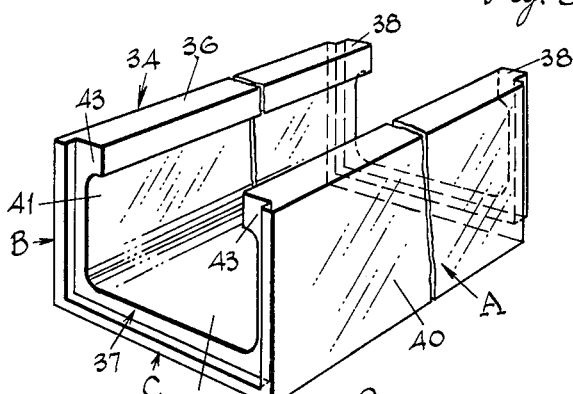
FIG. 4 is a perspective view of a radiant part of the lip-tile.

For these purposes, the preferred form of muffle or tubular lip-tile is comprised of a substantially U-shaped elongated member 34 forming the side walls 40 and 41 and the bottom wall 42 of the lip-tile, and a hanger member, generally designated by the numeral 35, which provides the top wall thereof to enclose and complete the tubular structure. The hanger member 35 is also adapted to bodily support the lip-tile 25 in its mounted position within the forming chamber 19. The member 34 is a refractory structure, cast from materials known to have highly conductive and low reflective characteristics. By way of example, one such material is silicon carbide. This, or equivalent materials, has been found to be well adapted to absorb the temperature effects of heating or cooling mediums from suitable sources and to then radiate the thermal influences thereof. While this member 34 can be produced as a single unit, it has been found preferable to employ several aligned parts which may be cast in sections 36, one of which is illustrated in FIG. 4 of the drawings.

According to this manner of use, one or more of the sections 36 will have an "end" face formed with a recessed area 37 while the opposite end will have a correspondingly formed outwardly directed area 38. When the sections 36 are arranged as viewed in FIGS. 2 and 3, the areas 37 and 38 of the several sections 36 will form an interfitting or interlocking relation as at 39 so that the vertically disposed walls 40 and 41 and the bottom walls 42 of the several sections 36 will form substantially solid wall surfaces of the member 34. Accordingly, the wall surface A, formed by the several walls 40 will constitute the surface of the lip-tile 25 facing the lip-tile 27; the wall surface B, formed by the walls 41, will be located adjacent the furnace wall 14, and the bottom C, formed by the several walls 42, will present a unitary surface directed toward the draw-pot 15 and, more particularly, the molten glass flowing therein from the cooling chamber.

Figure 3:
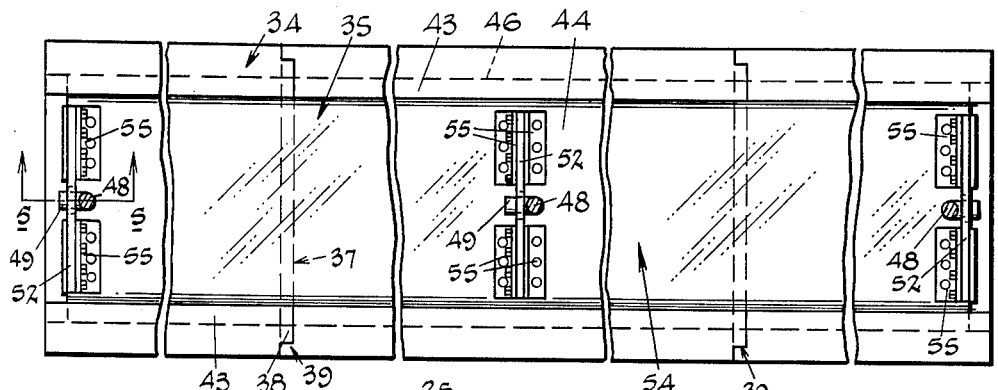
FIG. 3 is a top or plan view of the hollow lip-tile of FIG. 2.
Figure 5:
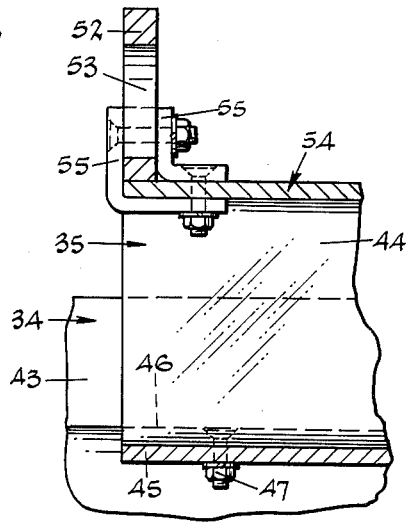
FIG. 5 is a cross-sectional detail view as taken on line 5—5 of FIG. 3.

In order to receive the hanger member 35 in closely interfitting relation and bodily support the U-shaped member 34, the upper ends of the walls 40 and 41 are provided with margins of increased thickness to form inwardly directed, elongated lugs 43 adapted to be engaged along their undersurfaces by the hanger member 35, thus providing the top wall of the tubular lip-tile. The hanger member is a substantially tubular unit, having an upper, inverted U-shaped part 44 and a lower part or panel 45. These may be suitably secured together along the edges of the panel 45 and the outwardly-directed flanges 46 of the part 44 as by bolts 47 (FIG 5). The hanger 35 is supported in the forming or drawing chamber 15 by means of rods 48 having hook-shaped ends 49 and being threaded at their opposite or upper ends 50 to receive nuts 51. In order to connect the rods 48 to the hanger 35, the same is provided with upwardly-directed ribs or plates 52 having openings 53 formed therein. As shown in FIGS. 3 and 5 of the drawings, the ribs 52 are rigidly attached to the web 54 of the upper portion 44 by means of angular brackets 55. The rods 48 pass through the roof 56 of the drawing chamber and are suspended from brackets 57 attached to the furnace structure, by the nuts 51 at the upper ends thereof. Accordingly, the lower face C of the hollow or muffle-type lip-tile can be raised or lowered with reference to the surface of the molten glass 16 in the draw-pot 15.

It will thus become apparent that when in use and as viewed in FIGS. 1 and 2, the lip-tile 25 will substantially seal the outlet arch area 13 from the drawing chamber 19 both transversely along the wall 14 and likewise at its ends along the side walls 26 of the chamber. Consequently, the flames from burners 58 can be introduced through ports 59 in the walls 26 and the heat therefrom will enter the tubular passageway 60 formed by the member 34 and the panel 45 of the hanger 35. In view of the heat-absorbing characteristics of the member 34, this means of introducing air or flames at high temperatures can be realized in the radiation of such heat through the muffle lip-tile 25 and particularly the lower surface C. Where the flames are directed into the passageway 60 at the opposite ends thereof, the radiant heat afforded will be more or less directively applied toward the molten glass flowing along the side walls 32 of the draw-pot 15. Also, since the passageway of the lip-tile has open communication through the ports 59, the resultant waste gases from the burners 58 will be carried outwardly so as not to enter the area above the draw-pot or into the drawing chamber 19.

In the event that an inverse manner of control is to be employed, a suitable air pipe 61, indicated in broken line in FIG. 2, can be inserted into the more central area of the passageway 60 which will operate to reduce the temperature of the of the lip-tile in this area to the end that the radiated influence of the cooler air will be directed downwardly onto the hotter area of the glass. Thus when the edges of the rising sheet indicate that the working temperatures of the glass forming the sheet margins is sufficiently high to produce the same without the use of burners, it may be found that the central span of the sheet is running too thin. This can be overcome and a sheet of satisfactory lateral thickness obtained, as aforementioned, by the radiation of a cooling influence onto the more centrally disposed glass with a resultant lowering of the temperature therein to approximately those temperatures found in the edge portions.

As shown in FIGS. 6 to 9 inclusive, a modified or alternative form of hollow or muffle lip-tile is illustrated which may be employed to equally effective advantage in radiantly imposing a control on the thermal conditions of molten glass. The lip-tile, generally designated by the numeral 62, essentially differs from the one heretofore described in that as herein disclosed the radiating area is confined to the lower surface and is in the form of a relatively narrow panel.

Figure 6:
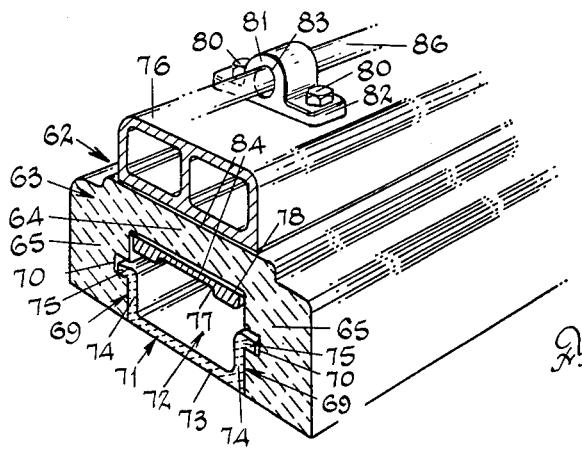
FIG. 6 is a fragmentary perspective view of a modified form of lip-tile.
Figure 9:
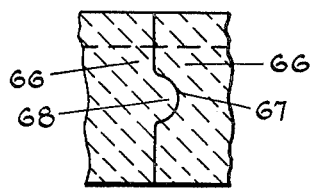
FIG. 9 is a fragmentary cross-sectional detail view of the modified form of lip-tile.

For this purpose, the main body portion of the lip-tile 62 is formed by a refractory block 63. As shown in FIG. 6 of the drawings, the refractory block 63 in end elevation is U-shaped in an inverted position and is thus formed by a horizontally disposed top wall or web 64 and integral downwardly directed side walls or legs 65. In the modified form of muffle lip-tile, the block 63 may, as in the case of the lip-tile member 34, be formed of several sectional units 66 and for this purpose, the ends of the units are formed with interfitting groove and rib portions 67 and 68 as shown in FIG. 9. In each inner vertically disposed wall surface 69 of each block side wall 65, a horizontally disposed groove 70 is formed to extend laterally between the ends thereof. When the sectional units 66 have been assembled in end to end relation, the opposed grooves 70 are adapted to receive a U-shaped member or panel 71 to close the lower end of the refractory block 63 and thus form the bottom wall of the modified form of tubular lip-tile. When the block 63 and panel 71 are so arranged in closely interfitting relation therein, a hollow passageway 72 is created therein.

The panel 71 is formed of a refractory material, such as silicon carbide, as above described in connection with the U-shaped member 34, and accordingly, affords a heat transmitting or radiating lower surface for the lip-tile 62. The radiant wall or web 73 of the panel 71 is formed integrally with vertically disposed legs 74 which are provided with outwardly directed flanges 75. The flanges 75 are adapted to be received in the grooves 70 of the block 63 when the panel 71 is inserted between the legs 65 of the block and slid therealong until the respective opposite ends of the block and panel are in alignment.

The lip-tile 62 is supported in its installed position by means of a tubular bar 76 and a plate 77 having marginal edges 78 of greater thickness than the central area or web therebetween. The block 63 of the lip-tile and the bar 76 are provided with aligned holes equally spaced from one another while the plate 77 has complementary tapped holes 79 in the thicker marginal edge of portions 78. Bolts 80 are passed through holes in carrier or saddle brackets 81, the bar 76, the block 63 and then threaded into the plate 77. The brackets 81 have a base 82 and a centrally disposed "eye" section 83. In order that the several elements can be more or less rigidly assembled without damaging the web 64 of the refractory block 63, strips 84 of resilient, heat-resistant material, such as asbestos, are interposed between the opposed surfaces of the bar 76 and block 63 and the block and the plate 77. As viewed in FIG. 8, this relationship of these elements has been illustrated by breaking the cross-sections in a stepwise manner. Thus at the leftmost end, the sectional area extends through a tubular passageway 85 of the bar 76; likewise, the central area of this figure depicts the character of the parts in a vertical section along the points of bolt insertion while the rightmost end illustrates the exterior surfaces of the bar 76 and block 63.

Figure 7:
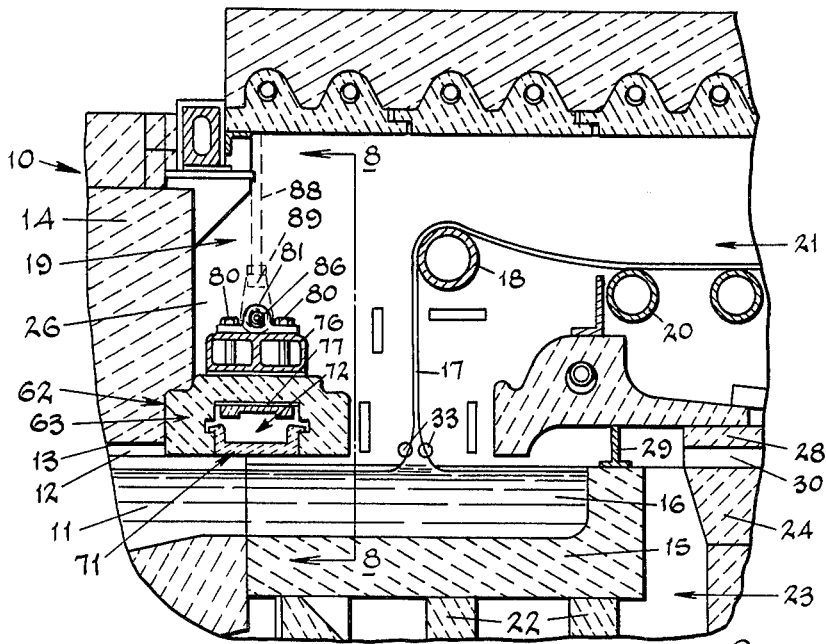
FIG. 7 is a fragmentary longitudinal vertical section of a sheet glass drawing furnace wherein the modified form of lip-tile is employed.
Figure 8:
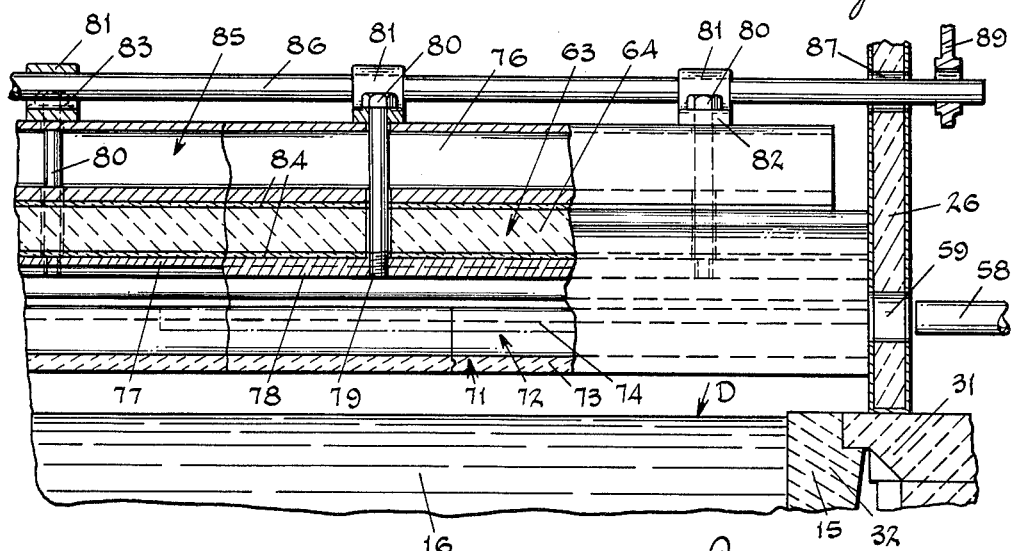
FIG. 8 is a transverse vertical section of the furnace as taken on line 8—8 of FIG. 7.

Thus, as viewed in FIGS. 7 and 8 of the drawings, the lip-tile 62 may be supported in the drawing chamber 19 of the sheet glass furnace by means of a pipe or rod 86 passed through the several brackets 81 with the opposite ends thereof passing through the ports 87 of the chamber side walls 26. The pipe 86 is carried, outwardly of the furnace, by means of vertically disposed rods 88 having a conventional pipe hanger 89 attached to the lower ends thereof. These rods, as in the case of the rods 48, are suspended from the furnace structure and may likewise be employed to vertically adjust the position of the lip-tile.

In operation of the sheet or window glass drawing machine, either the preferred or modified form of lip-tile operates substantially in the same manner as a muffle since the introduction of flames from burners 58 into the substantially sealed passageway thereof will direct high heat onto the inner surface of the heat-absorbing panel and thereby cause direct radiation onto the surface of the molten glass 16 as indicated by the arrows D in FIGS. 2 and 8. This will raise the temperature of the glass along the edges of the pool to a degree compatible with the normally hotter central areas. Likewise since the lower surface C of the lip-tile has a relatively low reflectivity, the loss of heat in the central area of the molten glass through the panel will be reduced. When the center of the pool of molten glass is found to be considerably higher in temperature than the edges thereof, the introduction of cooling air into the lip-tile will operate to reduce the temperature to a degree compatible with those in said edges, if this is found to be desirable. In any event, the open ends of the lip-tile, being in communication with the outside atmosphere, will permit the rapid escape of waste gases or air without entry of the same into the drawing chamber and into the vicinity of the glass being continuously mounted into sheet or ribbon formation.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In a continuous sheet glass furnace, a cooling chamber, a working receptacle adjoining said cooling chamber and in communication therewith to receive molten glass therefrom, a forming chamber above the working receptacle provided with an end wall at the end thereof adjacent the cooling chamber and also with oppositely disposed side walls, a tubular lip-tile located in the forming chamber and arranged transversely between the side walls thereof, said tubular lip-tile having a bottom wall and side walls, with the ends thereof being open, said bottom wall being disposed closely adjacent the surface of the molten glass flowing from the cooling chamber into the working receptacle, means for supporting the tubular lip-tile closely adjacent said end wall of the forming chamber and above the working receptacle, and means for introducing a heat exchange medium into at least one end of the lip-tile for regulating the temperature of the molten glass flowing therebeneath into the working receptacle.

2. In a continuous sheet glass furnace as claimed in claim 1, in which the bottom wall of the lip-tile is of a heat conductive refractory material.

3. In a continuous sheet glass furnace as claimed in claim 1, in which the means for introducing the heat exchange medium into the ends of the lip-tile comprises sources of heat.

4. In a continuous sheet glass furnace, a cooling chamber, a working receptacle adjoining said cooling chamber and in communication therewith to receive molten glass therefrom, a forming chamber above the working receptacle provided with an end wall at the end thereof adjacent the cooling chamber and also with oppositely disposed side walls, a tubular lip-tile located in the forming chamber and arranged transversely between the side walls thereof, said tubular lip-tile having a bottom wall and side walls, with the ends thereof being open, said bottom wall being disposed closely adjacent the surface of the molten glass flowing from the cooling chamber into the working receptacle, means for supporting the tubular lip-tile closely adjacent said end wall of the forming chamber and above the working receptacle, and means for introducing a heat exchange medium into one end of the lip-tile, said last-named means comprising a source of coolant, and means within the lip-tile for receiving the coolant and discharging it into the lip-tile intermediate the ends thereof.

5. In a continuous sheet glass furnace as claimed in claim 1, in which the means for supporting the lip-tile comprises a hanger member engaging the side walls of the lip-tile in closely interfitting and supporting relation therewith.

6. In a continuous sheet glass furnace as claimed in claim 5, in which the bottom wall and side walls of the lip-tile are of a refractory material, in which the hanger member includes a panel forming the top wall of the lip-tile, and in which the side walls of the lip-tile are inwardly enlarged at their upper ends to engage the panel along the side edges thereof in closely interfitting and supporting relation.

7. In a continuous sheet glass furnace, a cooling chamber, a working receptacle adjoining said cooling chamber and in communication therewith to receive molten glass therefrom, a forming chamber above the working receptacle provided with an end wall at the end thereof adjacent the cooling chamber and also with oppositely disposed side walls, a tubular lip-tile located in the forming chamber and arranged transversely between the side walls thereof, said tubular lip-tile comprising an inverted U-shaped refractory body portion forming the top wall and depending side walls of said lip-tile and a heat conductive refractory base panel carried by the spaced side walls and forming the bottom wall of the lip-tile, means for supporting the lip-tile closely adjacent said end wall of the forming chamber and above the working receptacle, and means for introducing a heat exchange medium into at least one end of the lip-tile for regulating the temperature of the molten glass flowing therebeneath into the working receptacle.

8. In a continuous sheet glass furnace as claimed in claim 7, in which the top wall and depending side walls are integral with one another and the side walls are provided with grooves, and in which the panel forming the bottom wall is received between said side walls and provided with outwardly directed flanges which are received within the grooves in said side walls.

9. In a continuous sheet glass furnace, a cooling chamber, a working receptacle adjoining said cooling chamber and in communication therewith to receive molten glass therefrom, a forming chamber above the working receptacle provided with an end wall at the end thereof adjacent the cooling chamber and also with oppositely disposed side walls, an elongated hollow lip-tile located in the forming chamber and arranged transversely between the side walls thereof, said lip-tile having a bottom wall and side walls, said bottom wall being disposed closely adjacent the surface of the molten glass flowing from the cooling chamber into the working receptacle, means for supporting said hollow lip-tile closely adjacent said end wall of the forming chamber and above the working receptacle, and means for introducing a heat exchange medium into at least one end of the lip-tile for regulating the temperature of the molten glass flowing therebeneath into the working receptacle, said means for introducing the heat exchange medium into the hollow lip-tile comprising a source of coolant.

10. In a continuous sheet glass furnace as claimed in claim 1, in which said tubular lip-tile comprises a plurality of aligned, interfitting sections.

11. In a continuous sheet glass furnace as claimed in claim 5, in which said tubular lip-tile comprises a plurality of aligned, interfitting sections.

References Cited by the Examiner

UNITED STATES PATENTS

| | | | |
|---|---|---|---|
| 1,391,406 | 9/1921 | Rhonemus | 65—202 |
| 1,606,409 | 11/1926 | Fowle | 65—202 |
| 1,610,103 | 12/1926 | Mambourg | 65—202 |
| 1,615,842 | 2/1927 | Hitner | 65—203 |
| 1,795,943 | 3/1931 | French | 65—202 |

DONALL H. SYLVESTER, *Primary Examiner.*